United States Patent Office 3,787,567
Patented Jan. 22, 1974

3,787,567
OCTADADECYLAMMONIUM DIETHOXYDITHIO-PHOSPHATE USED IN THE TREATMENT OF DERMATOMYCOSES
Nikolai Nikolaevich Melnikov, ulitsa D. Ulyanova, 4/3, korpus A, kv. 96; Boris Abramovich Khaskin, Novo-Alexeevskaya ulitsa, 3a, kv. 61; Grigory Nikolaevich Pershin, Novo-Peschanaya, 19, kv. 75; and Sofia Nikolaevna Milovanova, Kutuzovsky prospekt, 5/3, korpus 2, kv. 57, all of Moscow, U.S.S.R.
No Drawing. Filed Sept. 12, 1969, Ser. No. 857,572
Int. Cl. A01n 9/36; A61k 27/00
U.S. Cl. 424—199    5 Claims

ABSTRACT OF THE DISCLOSURE

A drug for treatment of dermatomycoses whose active ingredient is 1–5% by weight of octadecylammonium diethoxydithiophosphate of the following formula:

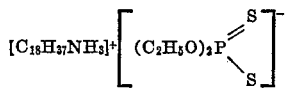

The present invention relates to a process for the production of N-substituted ammonium dialkoxydithiophosphates, compounds which are pharmacologically active and find application as drugs in medical practice, and are also employed as antiseptics for non-metallic materials.

A process is known for the production of salts of organic nitrogen-containing bases and dialkoxydithiophosphoric acids which comprises reacting phosphorus pentasulphide with an excess of an aliphatic alcohol ($C_1$–$C_4$) at the boiling point and treating the product, which contains dialkoxydithiophosphoric acid, with an N-substituted amine containing $C_4$ or more carbon atoms in the molecule. The excess alcohol is then distilled from the reaction mixture to give the final product which comprises unidentified oily or grease-like substances.

The above process does not yield pure substances since the final product is contaminated with compounds which are always formed when $P_2S_5$ is reacted with alcohols, for example, such compounds as trialkoxythiophosphate, dialkoxy-S-alkyldithiophosphate, alkoxydithiophosphoric acid, etc. Said impurities are toxic for man and warm-blooded animals, making it impossible to employ the final products obtained by this process for therapeutic purposes.

It is an object of the present invention to provide a final product of high purity uncontaminated with by-products.

This object has been accomplished by the provision of a process for the production of N-substituted ammonium dialkoxydithiophosphates of the general formula

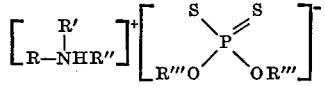

where R=alkyl $C_2$–$C_{18}$; R'=H or alkyl; R''=H, alkyl or $(CH_2)_3NH_3$; and R'''=lower alkyl, involving the reaction of dialkoxydithiophosphoric acids with N-substituted amines of the general formula

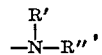

where R=alkyl $C_2$–$C_{18}$; R'=H or alkyl; and R''=H, alkyl or $(CH_2)_3NH_2$; in an organic solvent followed by isolation of the final product, wherein, according to the invention, dialkoxydithiophosphoric acids are reacted with N-substituted amines in hydrophobic organic solvents, namely, saturated hydrocarbons or ethers at a temperature of 20–80° C.

Petroleum ether, heptane, hexane, cyclohexane, ethyl ether or propyl ether is preferably employed as a hydrophobic organic solvent and the reaction is preferably carried out at 30–60° C.

To produce octadecylammonium diethoxydithiophosphate, diethoxydithiophosphoric acid is reacted with octadecylamine in a hydrophobic organic solvent at a temperature of 30–60° C.

Due to the low solubility of N-substituted ammonium dialkoxydithiophosphates in hydrophobic organic solvents at room temperature, the employment of such solvents in the present process promotes crystallization of the final products and solution of toxic impurities. Purification of the final products is likewise simplified and consists in simple washing with the same solvent or a single recrystallization from the same solvent.

The present process yields final products of high purity which makes possible the use of said products as drugs.

According to the invention octadecylammonium diethoxydithiophosphate is the active principle of a drug which we have tentatively named Octathion.

Octathion has high fungistatic and fungicidal activity against the pathogenic fungi *Microsporum lanosum*, Trichophyton, Achorion, Actinomyces, and *Candida albicans*. Octathion also has antibacterial activity against a broad spectrum of microorganisms, in particular coccal and spore-bearing bacteria.

Octathion is recommended for the treatment of dermatomycoses, various forms of epidermophytosis, rubrophytosis and blastomycosis. Octathion possesses a number of advantages over the drugs Undecine, Zincundan, Amycazole, and Nitrofungin. An important advantage of Octathion over said drugs is its keratolytic effect, making possible its application without preliminary treatment with commonly known desquamative drugs, thus providing a more deep-going therapeutic effect. Octathion ointment affords a favorable therapeutic effect in patients with microbial eczema. Octathion does not irritate the skin or the ocular mucosa, and is of low toxicity (5000 mg. per kg., body weight, for white mice); it is odorless and colorless.

The drug contains the active principle in combination with a pharmaceutical carrier for local application as a powder, or in combination with an ointment base. Talc is employed as the pharmaceutical carrier for the powder and anhydrous lanolin or petroleum jelly as the ointment base.

The drug is preferably used in the form of an ointment consisting of the following ingredients, wt. percent: octadecylammonium diethoxydithiophosphate 3, polyglyceryl sterate 18, lanolin 5, methylcellulose I, nipagin (methyl p-hydroxybenzoate) 0.15, nipasol (propyl p-hydroxybenzoate) 0.05, and distilled water 72.8.

It is advisable to employ the drug with the content of the active principle from 1 to 5 wt. percent.

The therapeutic effect of Ocathion has been studied in specialized clinics in the treatment of 259 patients, of whom 142 had various forms of epidermophytosis: intertriginous, dyshydrotic, and infiltrative-squamous with pronounced inflammatory symptoms accompanied by allergic rash. 117 patients had various forms of rubrophytosis including the bullous form with allergic rash on the hands and dorsal surface of the feet.

After beginning treatment with Octathion in the form of an ointment or powder, itching disappeared in 2–3 days; edema, inflammatory symptoms and bullae disappeared by the end of the first week; and dermal edema at eruption foci, as well as allergic reactions, disappeared by the end of the second week. The keratolytic action of the drug was noted in all cases; namely, desquamation at foci of infection. Complete disappearance of fungal infection was observed in 1–3 weeks after beginning treatment with the drug; by that time patients were fully cured. There were no relapses.

Octathion is applied in the form of 1–5% ointment or powder. It is advisable to apply ointment or powder 2–3 times a day, depending on the form of the disease.

Octathion ointment and powder are stable in storage. They should be kept at a temperature of 4° C.

Octathion has no side-effects and is tolerated well by patients. There are no contraindications to its use.

The process of the present invention is illustrated in the following examples.

EXAMPLE 1

To a solution of 0.05 g.-mol of octadecylamine in 10–15 ml. of petroleum ether is added dropwise with stirring at a temperature of 50–60° C. 0.05 g.-mol of diethoxydithiophosphoric acid. The reaction mixture is stirred at the same temperature for 1–2 hours and is then cooled to room temperature. The N-octadecylammonium diethoxydithiophosphate which precipitates is filtered out and recrystallized from petroleum ether. Yield 85%; M.P. 59–60.5° C.

Found, percent: N, 3.21; S, 13.95. Calculated for $C_{22}H_{50}NO_2PS_2$, percent: N, 3.07; S, 14.05.

EXAMPLE 2

In conditions similar to those of Example 1, octadecylamine is reacted with di-n-propoxydithiophosphoric acid in n-hexane to give N-octadecylammonium di-n-propoxydithiophosphate.

Yield 80%; M.P. 49.5–51° C.

Found, percent: N, 2.83; S, 12.93. Calculated for $C_{24}H_{54}NO_2PS_2$, percent: N, 2.89; S, 13.20.

EXAMPLE 3

To a solution of 0.05 g.-mol of dimethyloctadecylamine in 10–15 ml. of ethyl ether is added dropwise at a temperature of 20° C. 0.05 g.-mol of diethoxydithiophosphoric acid. The mixture is held for 1 hour at room temperature and is then cooled to −5 to −10° C. whereupon crystals are formed which are filtered out and washed with or recrystallized from ethyl ether. N-dimethyl-N-octadecylammonium diethoxydithiophosphate is obtained in a yield of 75%; M.P. 54–55° C.

Found, percent: N, 2.97. Calculated for $$C_{24}H_{54}NO_2PS_2,$$

percent: N, 2.89.

EXAMPLE 4

In conditions similar to those of Example 3, dimethyloctadecylamine is reacted with di-n-propoxydithiophosphoric acid in n-heptane to give N-dimethyl-N-octadecylammonium di-n-propoxydithiophosphate. Yield 70%; M.P. 32–33° C.

Found, percent: N, 2.88; S, 12.32. Calculated for $C_{26}H_{58}NO_2PS_2$, percent: N, 2.73; S, 12.50.

EXAMPLE 5

In conditions similar to those of Example 3, diethylamine is reacted with diethoxydithiophosphoric acid in propyl ether to give diethylammonium diethoxydithiophosphate.

Yield 75%; M.P. 84–85° C.

Found, percent: N, 5.44; S, 24.7. Calculated for $C_8H_{22}O_2NPS_2$, percent: N, 5.42; S, 24.82.

EXAMPLE 6

To a solution of 0.05 g.-mol of octadecyltrimethylenediamine in 10–15 ml. of petroleum ether is added dropwise with stirring at a temperature of 50° C. 0.05 g.-mol of diethoxydithiophosphoric acid. The mixture is held at this temperature 1 hour and is then cooled to −5 to −10° C. and the crystals which form are filtered out. Octadecyltrimethylenediammonium diethoxydithiophosphate is obtained in a yield of 63%; M.P. 66–68° C.

Found, percent: N, 5.42; S, 12.47. Calculated for $C_{25}H_{57}N_2O_2PS_2$, percent: N, 5.46; S, 12.48.

What is claimed is:

1. A pharmaceutical composition for the treatment of dermatomycoses comprising a fungicidally effective amount of octadecylammonium diethoxydithiophosphate having the formula

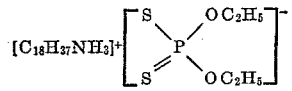

as the active ingredient and a pharmaceutically acceptable carrier selected from the group consisting of talc and an ointment base.

2. The composition of claim 1 wherein the active ingredient is present in an amount of from 1 to 5% by weight.

3. The composition of claim 1 wherein the carrier is talc.

4. The composition of claim 1 wherein the carrier is an ointment base selected from the group consisting of petroleum jelly and anhydrous lanolin.

5. A method of treating dermatomycoses which comprises applying to the affected skin area a fungicidally effective amount of octadecylammonium diethoxydithiophosphate having the formula

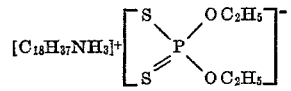

References Cited

UNITED STATES PATENTS 1,748,619   2/1930   Romieux et al. ____ 260—987 X
3,002,014   9/1961   Dinsmore et al. ___ 260—925 X ALBERT T. MEYERS, Primary Examiner L. SCHENKMAN, Assistant Examiner